United States Patent
Ward

(10) Patent No.: US 8,522,494 B2
(45) Date of Patent: Sep. 3, 2013

(54) SYSTEM FOR CREATING A TENSIONED WALL COMPOSED OF INDIVIDUAL LED TILES

(75) Inventor: Matthew Ward, San Francisco, CA (US)

(73) Assignee: Barco, Inc., Duluth, GA (US)

( * ) Notice: Subject to any disclaimer, the term of this patent is extended or adjusted under 35 U.S.C. 154(b) by 1459 days.

(21) Appl. No.: 11/076,273

(22) Filed: Mar. 9, 2005

(65) Prior Publication Data

US 2005/0201087 A1    Sep. 15, 2005

Related U.S. Application Data

(60) Provisional application No. 60/552,965, filed on Mar. 11, 2004.

(51) Int. Cl.
*E01F 9/00*    (2006.01)
(52) U.S. Cl.
USPC .......................................... 52/174; 52/506.07
(58) Field of Classification Search
USPC ................ 362/147–150, 800, 404, 408, 576; 40/541–544, 546, 547, 564–580, 605, 617; 52/506.07, 733.1, 174
See application file for complete search history.

(56) References Cited

U.S. PATENT DOCUMENTS

| | | | | |
|---|---|---|---|---|
| 5,025,355 | A * | 6/1991 | Harwood | 362/147 |
| 5,720,549 | A * | 2/1998 | Lavy | 362/378 |
| 5,934,789 | A * | 8/1999 | Sinclair et al. | 362/189 |
| 6,116,750 | A * | 9/2000 | Hentz | 362/148 |
| 6,288,700 | B1 | 9/2001 | Mori | |
| 6,362,801 | B1 | 3/2002 | Yuhara | |
| 6,370,019 | B1 | 4/2002 | Matthies et al. | |
| 6,677,918 | B2 | 1/2004 | Yuhara et al. | |
| 6,757,589 | B1 * | 6/2004 | Parker et al. | 700/282 |
| 6,764,196 | B2 * | 7/2004 | Bailey | 362/147 |
| 6,871,983 | B2 * | 3/2005 | Jacob et al. | 362/364 |
| 7,036,965 | B2 * | 5/2006 | Dalton et al. | 362/488 |
| 7,186,000 | B2 * | 3/2007 | Lebens et al. | 362/184 |

\* cited by examiner

*Primary Examiner* — Basil Katcheves
(74) *Attorney, Agent, or Firm* — Aka Chan LLP

(57) ABSTRACT

Support wires can be used to hold up light tiles to provide a lightweight display system.

19 Claims, 10 Drawing Sheets

SYSTEM FOR CREATING A TENSIONED WALL COMPOSED OF INDIVIDUAL LED TILES

PRIORITY CLAIM

This application claims priority to the U.S. Provisional Patent Application No. 60/552,965, entitled "SYSTEM FOR CREATING A TENSIONED WALL COMPOSED OF INDIVIDUAL LED TILES" filed Mar. 11, 2004.

FIELD OF INVENTION

The present invention relates to lamps, especially lamps which contain light emitting diodes.

BACKGROUND

Existing light tile systems typically require an extruded aluminum housing that must be attached to a metal frame of some sort. These frames are ground supported by an external structure or make use of rigging systems so they may be suspended from a rated point.

There are some LED tile systems that are transparent but that require frames and ground support structures. The systems require secondary support structures in order to create walls of significant size. This is an additional cost and the structure tends to work against the goal of creating a transparent wall system. Many of these systems are tied to the window size of the building as designed. These are custom systems using extremely large light guides which limits the amount of information that can be communicated.

Alternative direct view LED systems are available in tubes and modules but these systems are not intended to provide the fill level (the percentage of the area of a pixel which generates the image) that a tile system provides. These systems do allow some level of transparency through variable pixel spacing or use in slat system. Examples of such systems are the Barco MiPix, the Opto Tech Intelligent Cluster, Lumino and the GLEC system.

Although some of these systems can be effectively integrated into the structure of the building they do not themselves constitute a wall or a structure. Any system must account for long term service since an installation may stand for decades. LED systems embedded in glass are an expensive problem.

BRIEF SUMMARY

The system of one embodiment allows for the creation of a transparent tile wall supported by support wire, such as a tensioned aircraft cable. The system only requires access from one side for the installation and removal of tiles.

The light tiles can contain light guides which can receive the light from light source, such as LEDs, and redirect the light toward viewing positions. The light guide can spread the apparent source of the light.

DETAILED DESCRIPTION

Figure 1:
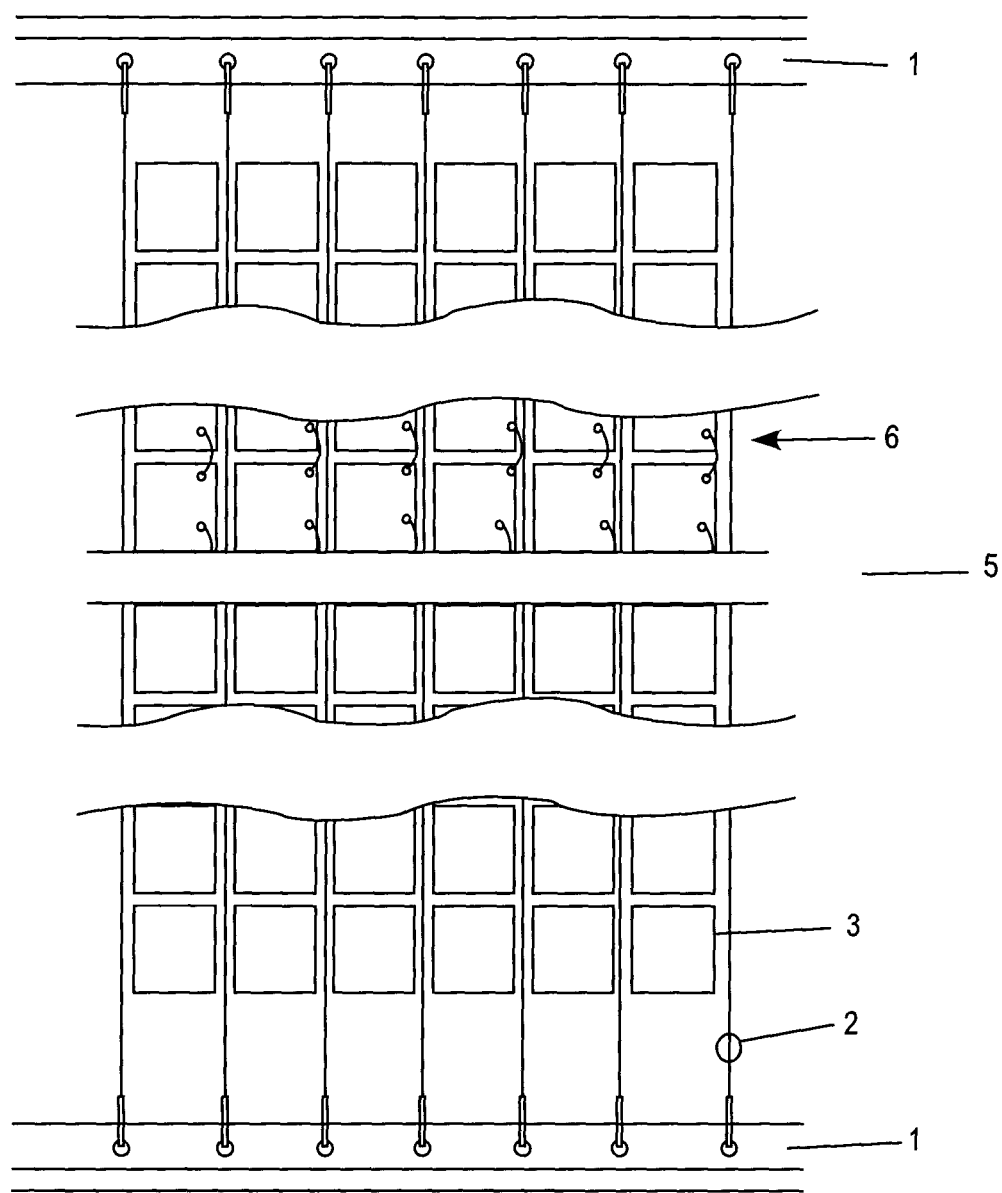
FIG. 1 is a diagram of one embodiment illustrating light tiles attached to support wires.

FIG. 1 shows one embodiment with support wires 2; and light tiles 3 attached to and supported by the support wires 2. The light tiles 3 can include a light source and a light guide. The system can be tensioned between structural points 1 which will allow support wire 2, such as aircraft cable, to be tensioned to a degree that will allow the attachment of the LED panels 3.

The use of support wires can greatly reduce the weight of the entire structure. One problem with using a frame to hold up the light tiles is that this can greatly increase the weight of the entire system. Additionally, the use of support wires increases the total display area and visibility of the light produced by the light tile. The support wires can be spaced parallel to one another such as the light tiles can be attached in a regular pattern to the supports wires. The light tiles can include an attachment unit, or the attachment unit can be part of the support wires. In one embodiment, the light tiles are clipped to the support wires. In one embodiment, the light tiles can attach to two support wires. This can be done by using an attachment unit on two different sides of the light tile. The light tiles can be made waterproof, such that condensation does not form within the light tiles. The arrangement of the support wires can determine the shape of the system including the light tiles. For example, the support wires can be arranged in a helix, such that the light tiles form a column. The support wires can be angled or arranged to form a shape or curve. The light tiles can then be clipped to the unit.

FIG. 1 shows rectangular or square shaped light tiles, but the light tiles can be curved, hexagon, triangle or any other shape. A hexagon shaped light tiles have advantages in producing curved light displays. The connectors for the hexagon could be positioned on the back of the light tile, so that the light tile in adjacent columns can be attached to the same support wire.

Data and power can be distributed using a series of non-structural utility bars or backup structures. FIG. 1 shows data and power provided from the nonstructural utility bar 5. A secondary structure can be positioned in behind or in front of the curtain wall (or in front depending on your point of view) Main power distribution and the addressing of the tiles can be handled by electronics concealed in these structures. The bars can be spaced meters apart which also adds to the overall transparency of the system.

Power and data can be looped from tile to tile with connectors 6 in a serial data system. Alternately, a column and row drive system could be used to minimize the amount of data distribution. Such a system might incorporate the support wires. Column information can be sent over the support wires (perhaps encoded with the power) and the row information can be looped from tile to tile.

Figure 2:
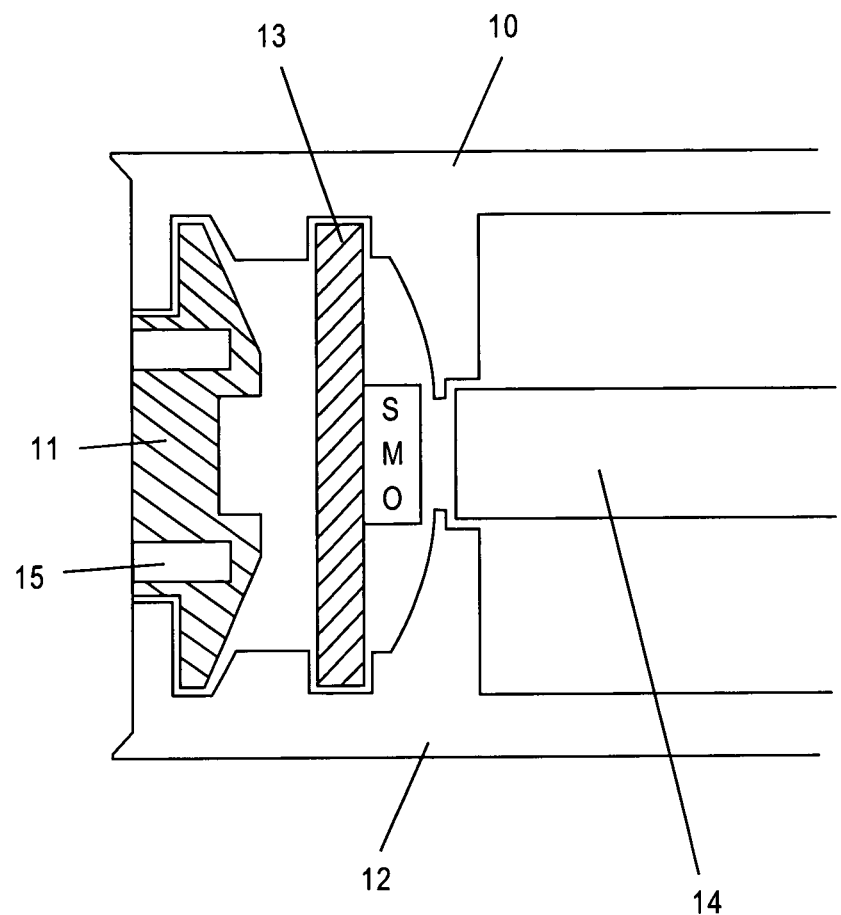
FIGS. 2 and 3 are diagrams illustrating a cross section of a light tile of one embodiment.
Figure 3:
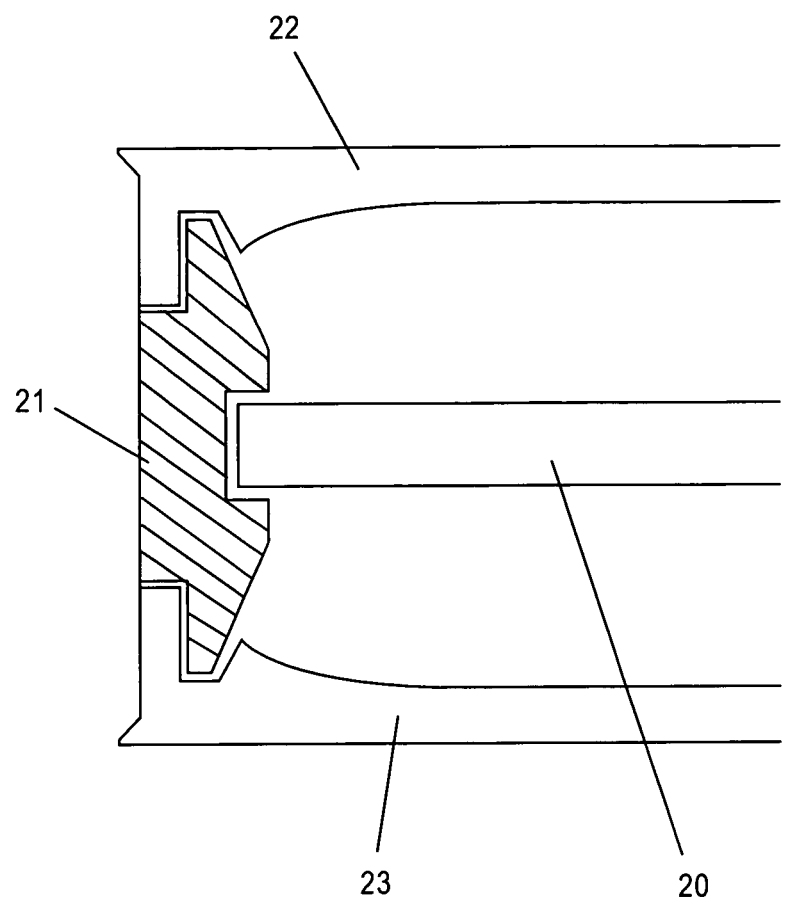

FIGS. 2 and 3 show details of one embodiment of a light tile. The light tiles can include a light source 13 and a light guide 14. In the example of FIG. 2, the light tile can be composed of a front shell 10, a heat sink 11, such as an extended or molded connection, a back shell 12, a light source 13 (that can be mounted on a printed circuit board) and a Light Guide 14. Points to attach mounting system 15 can be located in the channel.

FIG. 2 shows the sides of a light tile with features to locate the Light Guide 20. The light guide can be located in a channel the heat sink 21 which also serves to bond the front shell 22 and the rear shell 23. The light guide can have a printed dot pattern on it to diffuse and redirect light.

The heat sink 11 prevents heat from building up inside the light tile. Managing the proper transfer of heat from the inside of the light tile to the outside of the light tile is critical to achieving the power saving and product life benefits of an LED based system. The heat sink can be made of a metal, such as aluminum, or some other material with a relatively high conductivity of heat.

Figure 4:
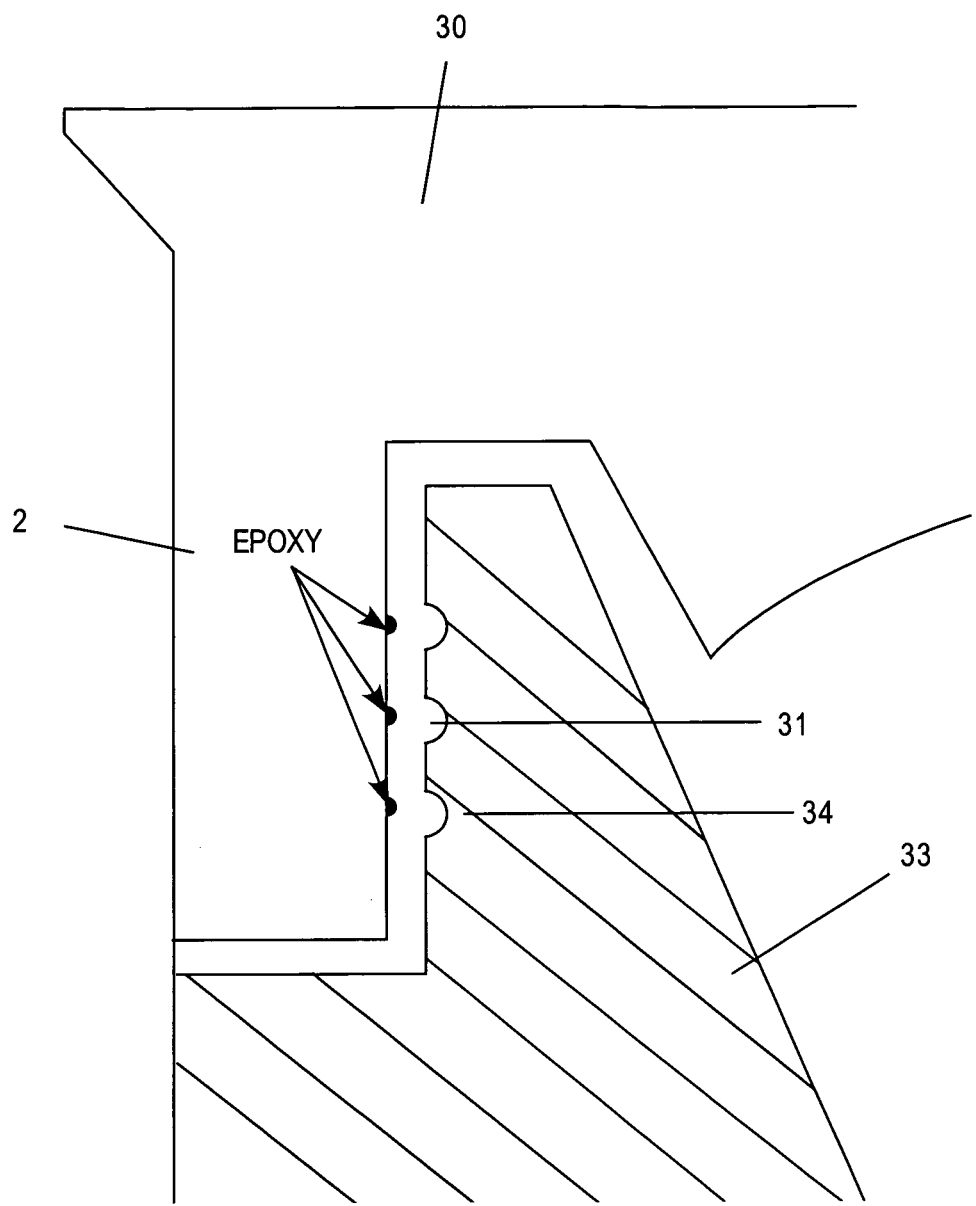
FIG. 4 is a diagram illustrating connection of a heat sink and shell of a light tile of one embodiment.

FIG. 4 is a light tile detail showing the joint between extrusion and front Shell. The front shell 30 can have features 31 which improve the bond with the channel 33. The channel can have corresponding features 34. This bond can be created during manufacturing with optical grade epoxy, resin or some other adhesive 32.

Figure 5:
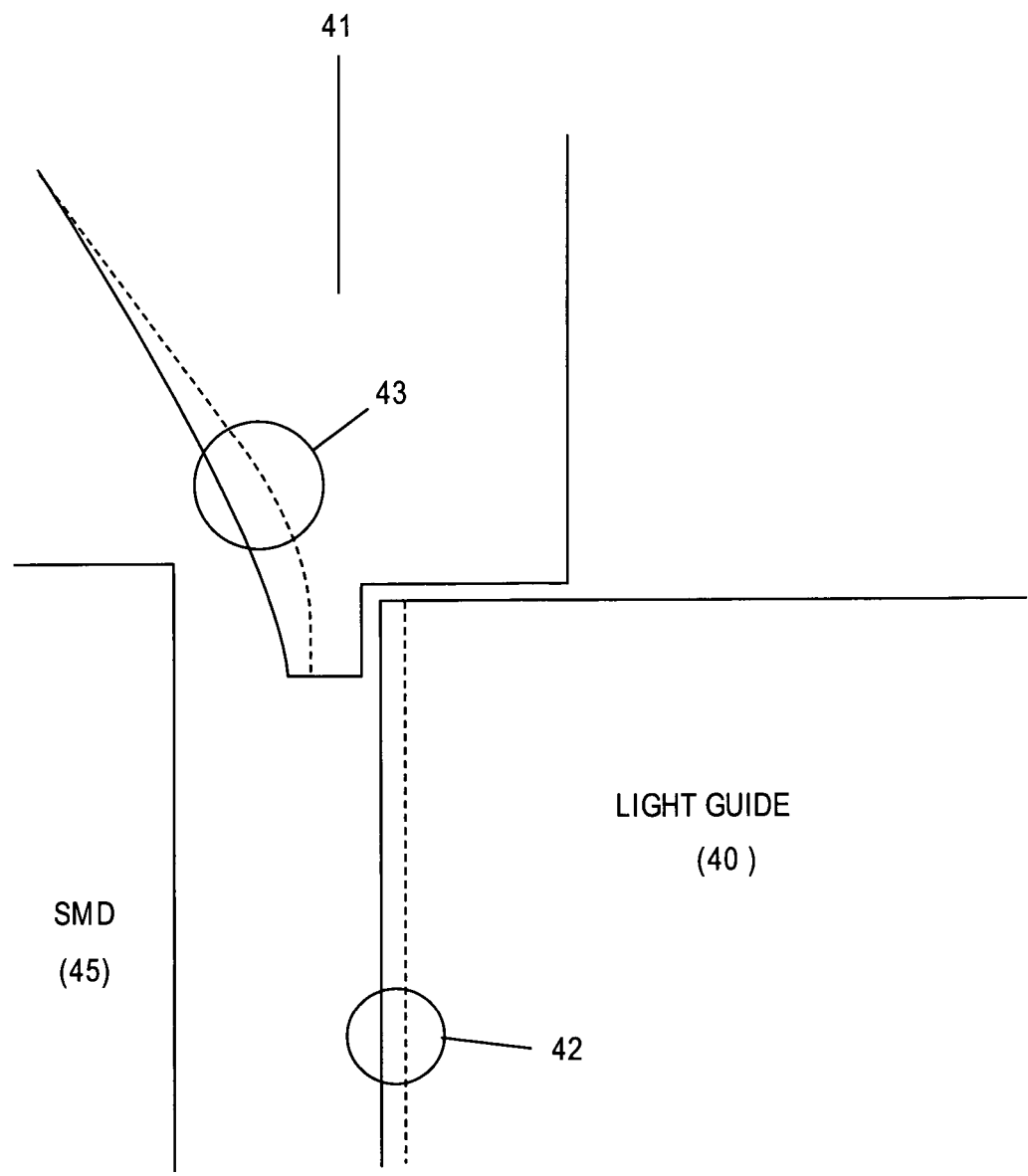
FIG. 5 is a diagram illustrating details of one design of a light tile of one embodiment

FIG. 5 shows an optical detail. The Light Guide 40 and the Exterior Shells 41 can booth incorporate optical features designed to improve the distribution of light 42 and as well as minimize the appearance 43 of the light source 45. In the example of FIG. 5, light from the light source curves back away to the sides.

Figure 6:
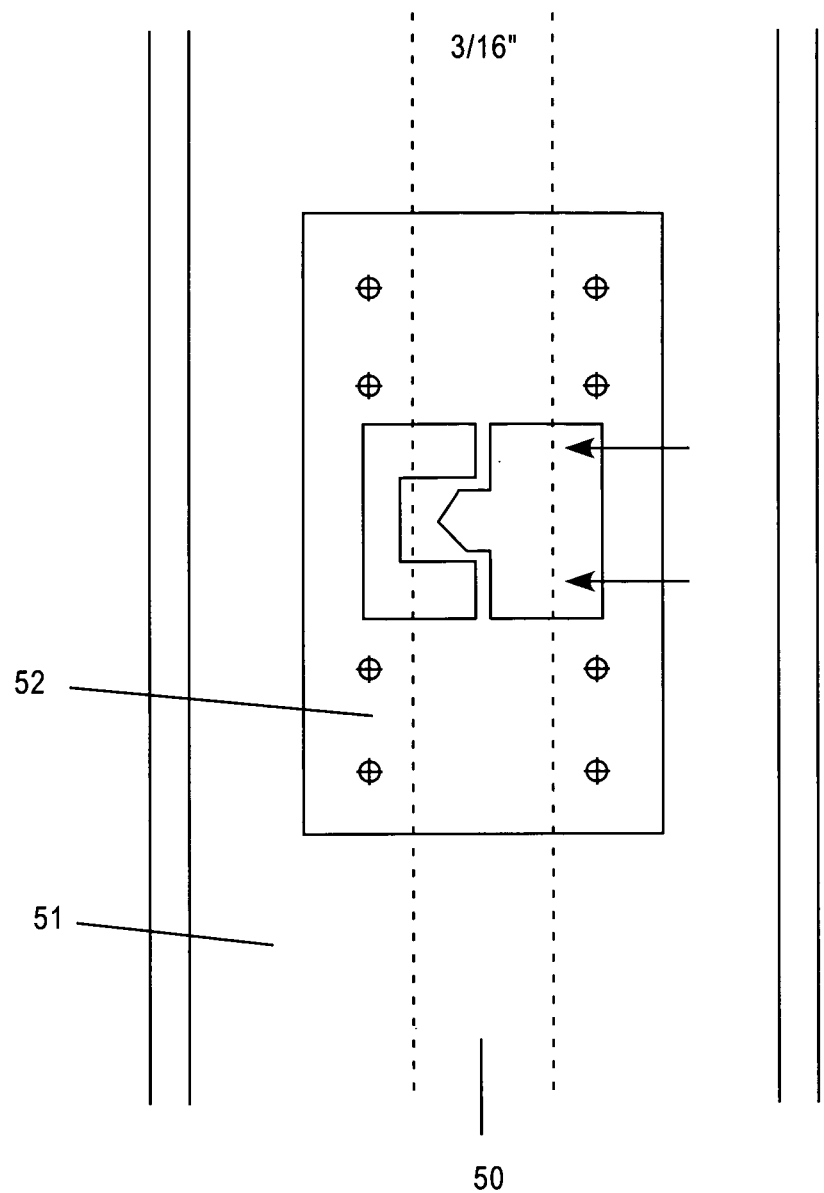
FIG. 6 is a diagram illustrating an attachment unit of one embodiment.

FIG. 6 shows an exemplary wire connection. The wire support 50 can be located on the load center of the tile 51. Means of attachment 52 to the cable can be incorporated into the tile.

The light tiles can have an attachment unit. The attachment unit can be controlled with a hex key or other tool. The side of the mechanism closest to the user can locate the support wire. The area facing the support wire can have an engineered surface or some sort of rubber anti slip coating. The catch can be graduated in order to increase pressure on the aircraft cable against the other surface.

The light tile can be modeled on a standard IGU (Insulated Glazed Unit), which is used in double pane window applications. This familiar architectural form provides several advantages. Although the tile may cover a large area most of the structure is on the outside edges. This helps reduce weight. The tile can also provides a sealed environment for the optical and electronic components so that the system may be used both indoors and out. This is important because as with any clear surface the tiles will need to be cleaned. The IGU is also a very popular format meaning that architects will quickly understand the multiple options they have when integrating such a system.

A IGU style system might allow for the removal of the housing to repair an LED. This can allow for direct view LED systems protected by glass. Ordinarilly, an LED encased in glass is not a practical solution, since when a diode dies there is no feasible way to de-laminate the glass.

In one embodiment, a system of surface mount LEDs are mounted on a plastic frame using small wires or a transparent conductor. This plastic frame can be mounted where the light guide would be in the basic system with the drivers mounted at the PCB location. These LEDs could even be mounted on a transparent film incorporating a transparent conductor solely as a heat sink. By using layers of film it might be possible to use very thin wires as the insulation provided by the film could simplify cable management.

The light tiles can include different colored LEDs. The light tiles can produce light by mixing light of the different colored LEDs. The light tiles can include a light guide to spread the light over a larger area. The system also includes a control unit adapted to use a video signal to control colors of the light tiles. The light source can provide light of different colors.

In one embodiment, a light tile comprises a light source a light guide operably connected to the light source and an attachment unit adapted for attaching the light tile to a support wire.

One embodiment is a system comprising elongated support members and light tiles attached to and supported by the support members. The light tiles including a light source. The elongated support members can be support wires, metal rods or some other object.

In one embodiment, the shell of the light tile protects the light guide. Many of existing light guide based systems use a light guide which is exposed. This leaves the optical system vulnerable to scratches and the slow attrition of basic cleaning. A scratch on the surface of the light guide creates a point which is an ideal exit point for light in the optical system. Such an imperfection becomes a hot spot since more light leaves the light guide through that point. However the system must be cleaned because the buildup of dirt and grease on the optical system creates some of the same problems. Systems which leave the optical system or the light source exposed are therefore not appropriate for LEP, OLED, PLED, TOLED or any plastic electronic system in development since these systems would be left similarly exposed.

There have been many efforts to animate the outsides of buildings. Times Square is a testament to the ongoing interest in this capability. Yet existing technologies do not seek to integrate themselves into the structure of the building. The displays in Time Square are either bolted onto the sides of buildings in a somewhat arbitrary manner or they sit inside the curtain wall. In both cases the building accommodates the LED screens causing obstruction to light and the sacrifice of critical square footage. Recent technologies such as the Onscreen Technologies video display attempt to implement a porous system architecture in order to eliminate this cumbersome structure without addressing the fact that buildings need a skin. A curtain wall or some sort of cladding is required with or without the video screen. None of the existing solutions represents a step towards the development of solid state building materials.

It is possible to illuminate the side of a building in a dynamic way using other means. Project Blinkenlights uses standard lighting systems with a custom controller and interface to light up the window bays of office buildings. This method has also been used to a degree in projects utilizing light products manufactured by TIR System and Color Kinetics. These systems all require space to direct the traditional lights at the surface to be illuminated. They are also generally only viewable from one side.

Figure 7A:
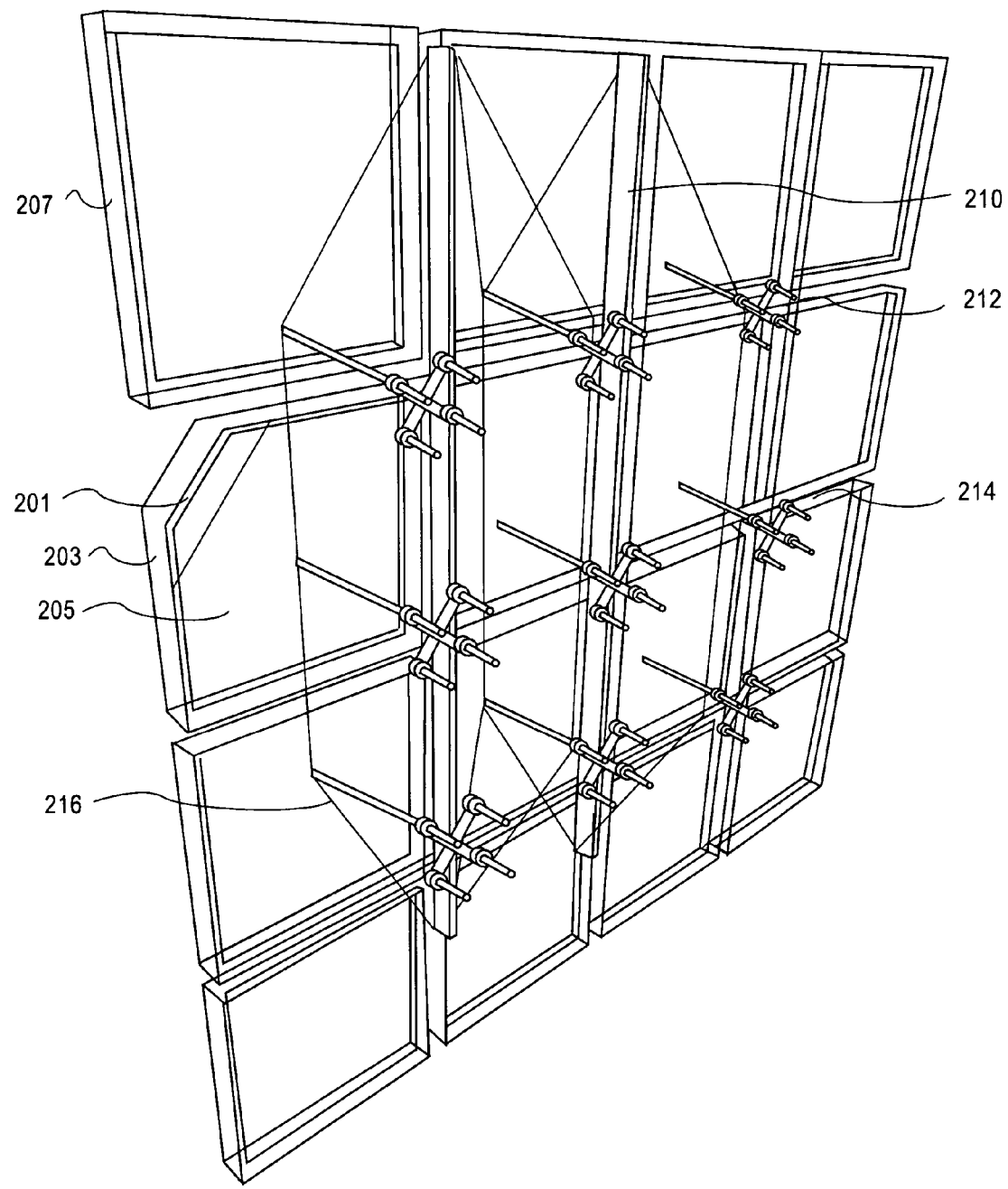
FIGS. 7A-7B are diagrams illustrating a tensioned curtain wall embodiment.
Figure 7B:
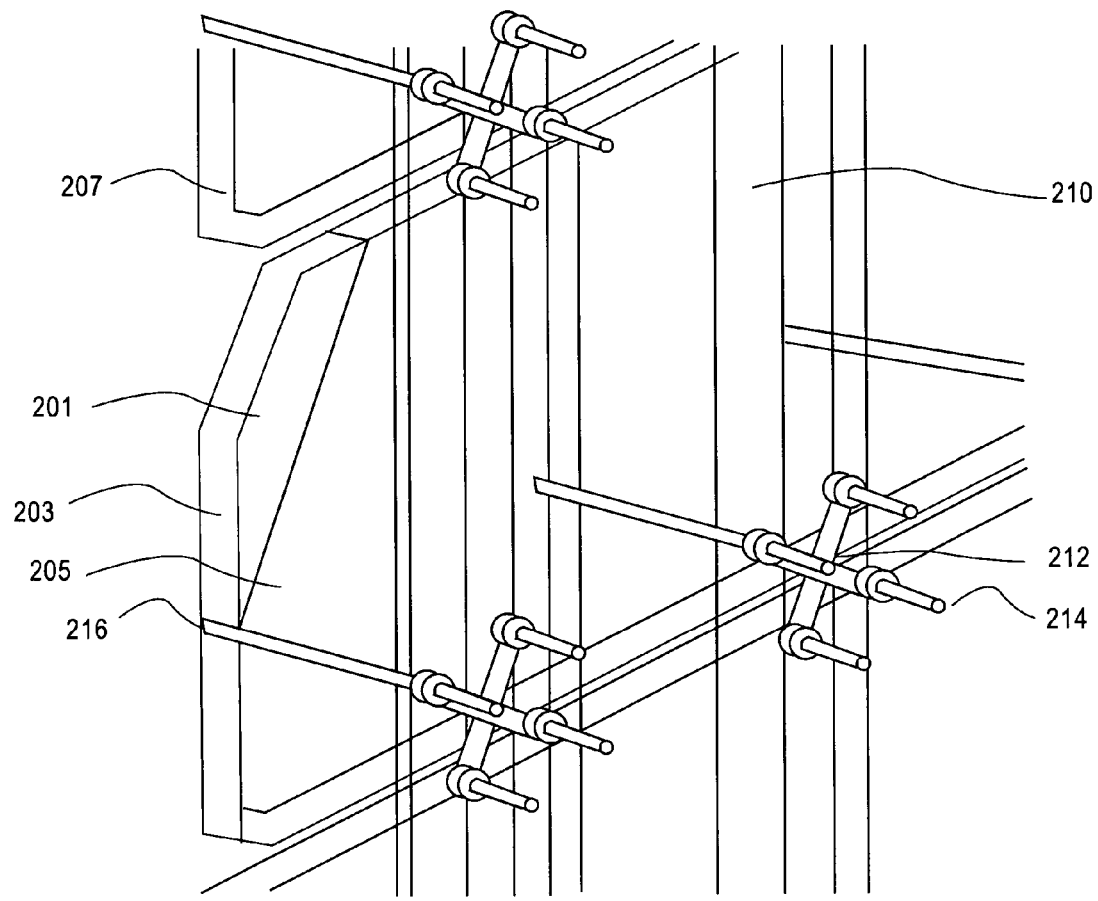

FIGS. 7A-7B show a tensioned curtain wall embodiment. In such a curtain wall system, a number of laminated glass panels can be incorporated into a wall (for example, in an atrium) using a truss system to keep a load on the glass panels using a cable and truss system. Such a system can incorporate light guide based light tiles thereby eliminating a secondary decorative system. A cable system or a series of tensioned arms 216 can attach to the lamps using an attachment arm 212. Pins 214 in the lamps would lock into the attachment arm. Light tiles can be composed of an outer shell 203, a second outer shell incorporating the pins 205, and a light guide 201. A heat sink 207 can also be included in order to guarantee proper cooling of the lamp. Such a system can include a back structure 210 which might incorporate data and power distribution for the wall.

Figure 8A:
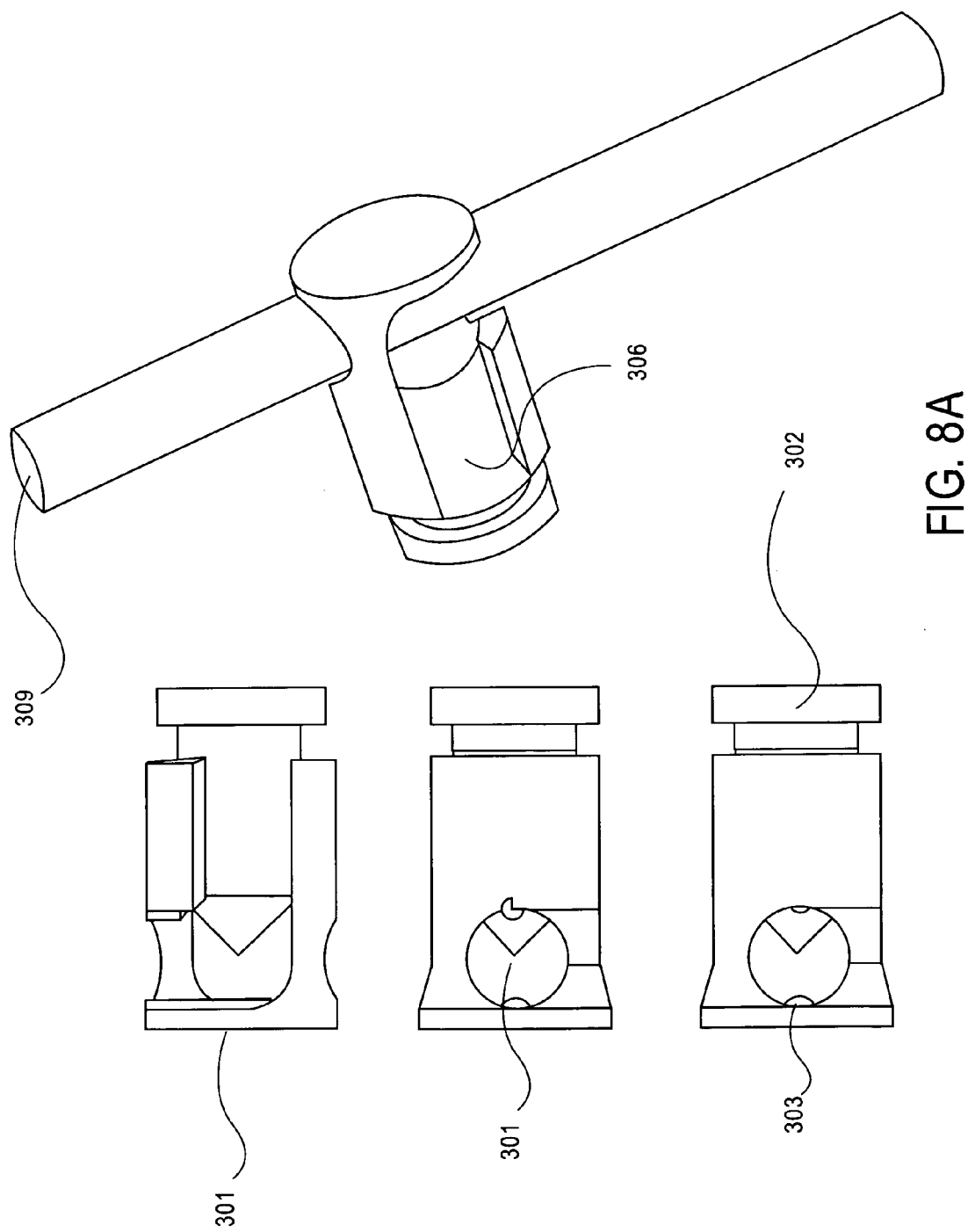
FIGS. 8A-8B are diagrams illustrating an attachment unit of an alternate embodiment.
Figure 8B:
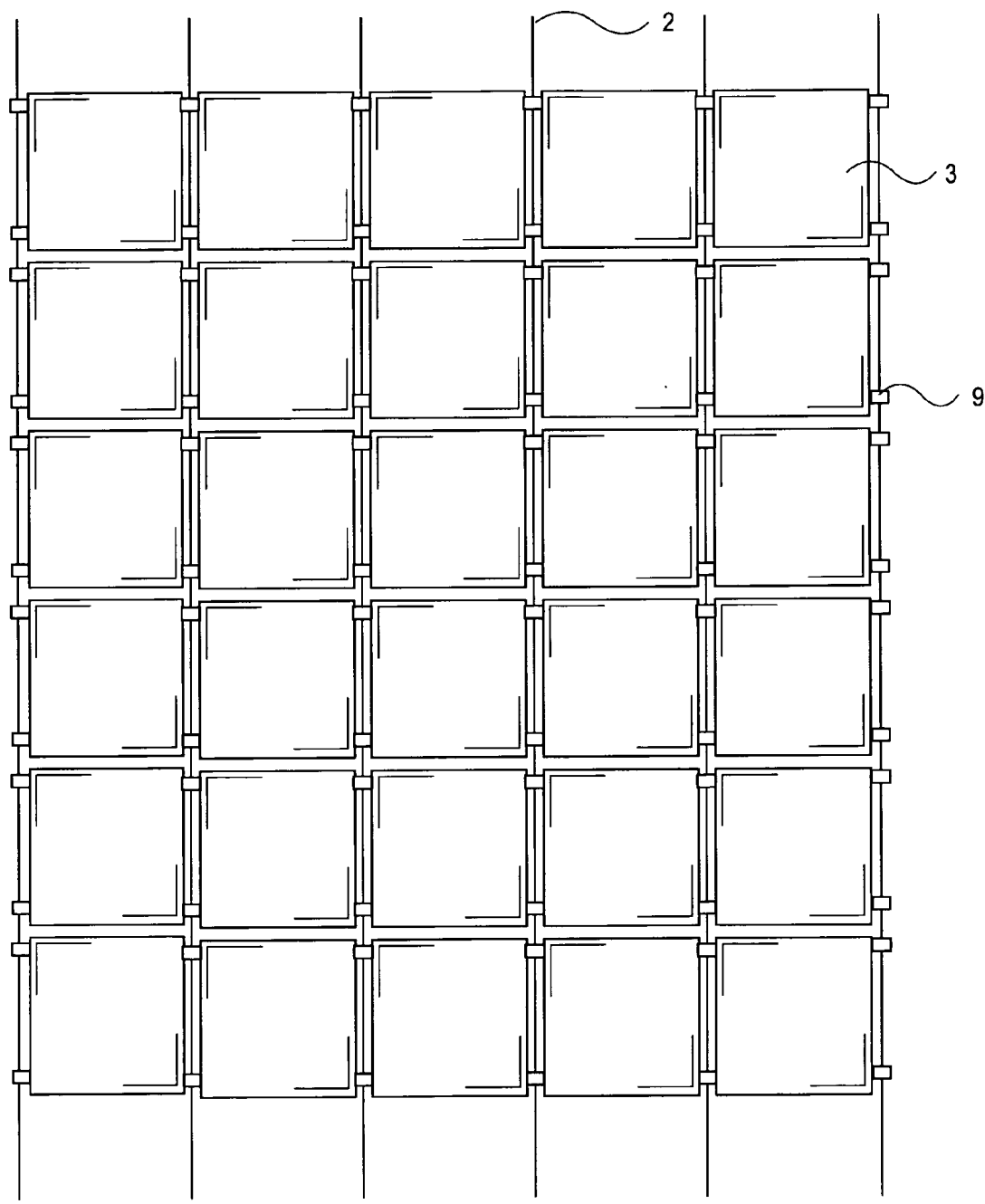

FIGS. 8A-8B are diagrams illustrating an attachment unit of an alternate embodiment. A twist lock mechanism can be composed of an outer cylinder 301 which incorporates an opening which can rotate one quarter turn around a cable 309. The cylinder can feature a ridge 303 in the opening. A pin 302 can mate with the outer cylinder. The end 304 of this pin 302 can apply pressure on the cable adding a safety factor to the mounting procedure. The pin and the cylinder can incorporate threads (not shown) in the region 306.

In one embodiment, the tile has four pins which would mate with the cable mounted hardware. The data and power distribution can be integrated into these cable mounted four point connectors. The low weight of the tiles relative to glass means that such a system might scale down substantially to the point where it would not intrude too far into the tiles. A threaded insert at the joints of the heat sink can be used for mounting.

FIG. 8B shows the location where the twist lock system 9 can be used to attach the light tiles 3 to the support wire 2.

The front or back (or both shells) of the panel can be translucent. The attachment mechanism can be part of the cable system. The tile can use a light source other than LED such as OLED, PLED or even more traditional lamps such as fluorescent. Some of these light sources would not need a light guide.

The tile can be square, rectangular or any other shape that might be easily integrated into a large array of tiles so that the tiles both fit together and can be suspended from a tensioned cable system.

Patterns can be incorporated in the molding of the shell or the pattern of the light guide or printed dot pattern on the light guides. The pattern on the light guide can be injection molded. Interesting shapes can be created by tensioning cable to different locations within a single installation. For example a helix shape can be produced.

The attachment mechanism can be molded into the shell.

Photovoltaics can be included along with a power storage component of some sort in order to make the system self-sufficient on power should conditions allow.

Tile can be made in curved forms. Multiple tiles can be fabricated together in panels and then attached to a tensioned system thereby reducing the number of attachment points. The cable size and point load considerations may outweigh this benefit.

Materials other than steel can be used for the tensioning lines. Composite materials and more traditional rigging materials such as webbing are possibilities. In smaller systems metal flat stock could be used as the supporting component even though it is not tensioned.

Power distribution can be incorporated into the tensioning cables.

Tiles using the Planon, or other flat fluorescent light source, can be incorporated into the tile system in order to provide light in certain locations.

The power and data can be distributed from the side with a vertical utility column rather than from the bottom using a horizontal utility column.

The system described here can easily be integrated completely into a standard glass curtain wall system by a company such as Pilkington. This completely eliminates and additional structure that might be required for such a system in turn reducing the cost of the project. A system using the light guide with the dot pattern would also partially reflect light back away from a building helping to reduce the heat load.

The light tiles can display information from a video signal. In one example, the light tiles can mix light from clusters of red, green and blue LEDs. A light guide can help mix the light from the LEDs. The light guide can spread the perceived origin of the light over a wider area as well as redirect the light to viewer locations.

Control units can receive a video signal over a video data bus from a video processor. Any type of video signal can be used. The control unit can select a sub-set of the pixels of the video data to drive the LEDs in the light tiles. The sub-set of pixels can be determined by addresses which are provided across the control bus or in another manner. In one example, the light tile group is an 8×8 grid of light tiles. An 8×8 sub-set of pixels within the video signal can be selected to determine color information for the light tiles. Data for more than one pixel in the video can be used to produce a single color to be displayed on a light tile within the light tile groups. The control unit can be used to adjust the intensity of the LEDs in accordance with a video signal. A monochrome embodiment can use LEDs of the same color to produce a single color, or "black-and-white" display.

In one embodiment, the color information from the video signal is converted to driving voltages for the LEDs. The LEDs are preferably calibrated so that the same driving voltage produces similar color intensities for the different colored LEDs.

A personal computer with local monitor can control a signal processor. The signal processor can provide a video signal to multiple panels. Each panel is constructed of multiple light tiles.

Picture element light tiles can use a light guide to mix colors and spread the light so that the apparent source of light is a relatively wide region such as, the front facing surface of the light tiles. This makes it comfortable to view the light tile from a few feet away. The low resolution picture element light tiles are thus very useful for designers and architects to incorporate into video displays in retail environments.

In one embodiment, the pitch, the distance from the center of one pixel to the center of the next pixel, is no less than 20 millimeters. In one embodiment, the pitch is 40 mm or greater.

In one embodiment, the pixel size of the light tile is about 20 mm or greater in width. Since the light tiles are relatively large, the disadvantages of prior art systems is avoided. Such pixels element light tiles are significantly larger than what is normally use in video displays. Video displays focus on making the pixels as small as possible and the use of larger pixels is counter-intuitive.

The use of the pixel wall element also addresses a number of criteria, in addition to viewing distance, which influence decisions regarding the use of low resolution video displays. Depth is a critical issue in any design process given the cost of floor space in any building. The wall mounted, picture element can be made relatively thin. The low resolution video display can be adapted to work with a wide variety of design specifications while maintaining a low price point. The low resolution video display can be easily integrated with other interior requirements such as shelving and signage.

In one embodiment, each pixel is packaged as a self-contained light tile for ease of maintenance. A housing conceals the LEDs.

The LEDs can be mounted on a printed circuit board (PCB) in a strip at the base of the pixel. A cable assembly can connect from PCB to a control unit (driver board) which converts incoming video information into voltage for the LEDs. Light from the LEDs is directed into a light guide. The light guide can be constructed of a plastic, glass or other material. In one embodiment, the light guide has a collimator to collimate light from the LEDs. The light guide can also use a printed pattern to reflect the light forward toward viewing positions.

In one embodiment, the light guide uses diffusion, such as a Fresnel grating, on the front facing surface. The back and/or sides of the housing can be treated with or composed of a reflective material. Light from the light tile is directed forward toward an optional cover or shell. The cover or shell can be a diffusion plate and/or tinted to improve the contrast of the color.

Surface Mounted LEDs can be used. Surface Mounted LEDs are relatively expensive but allow for a more compact light tile. A separate mixing light guide may be used, with or without a reflector, in order to achieve a more complete homogenization of color. The LEDs may be mounted perpendicular to the light guide. Organic LEDs (OLEDs) may be used to create the light tiles. Though-hole LEDs can also be used. The light tiles may be removed from the support wires and used separately with the same power distribution and video driver. The pixel size is not fixed. Different sized pixel light tiles may be used in one system. A driver board may have an adjustment for cable length due to resistive losses in the cables. Different types of materials may be used as light guides. A screen can be fabricated without the tinted plastic front face if contrast is not a priority. Slugs or plastic covers with no electronics can be mixed in with functioning pixels in a grid. Textured front faces or other coverings may be attached or hung in front of the pixels. A coating may be used on the front face to improve contrast. LED clusters at both ends can be used to maximize light output and color mixing a light tile. The light tiles can be housed in a transparent plastic or glass sheet. The pixel light tiles can be used to edge light shelving or to backlight signage.

The materials for the light tile can be IP 66 or IP 68 approved materials to allow for the external use of the light tiles. In one embodiment, the LEDs are grouped on the PCB in clusters of red, green and blue LEDs. The LEDs can preferably be calibrated so that a conventional video driver for LEDs to produce light that can be mixed within the light guide with the light tiles of the present invention.

The picture element light tiles can use a video signal to provide dynamic lighting effects within a store or other location. The video signal can be a prestored signal from a storage medium, such as a DVD or computer memory. Alternately, the video signal can be from a camera or computer generated.

The light guides can be used to create large video displays in which each picture element can be viewed from 360 degrees vertical orientation and 160 degrees horizontal orientation. The pixel light tiles can be placed anywhere with no fixed distance between the light tile and the required video processing.

Existing screens have a fixed relationship in pitch which is a measurement of the distance from a pixel center to the next pixel center. A 10 mm screen fabricated using the Modular Enclosure method will always be a 10 mm screen. The design of the bulbed pixel light tile allows a designer to change pitch in a graduated manner within one screen while the screen is being installed.

The LED cluster may be Surface Mounted Device (SMD). In one embodiment, a basic cluster is composed of at least one red, green and blue LED mounted to a PCB. A cable assembly from the LED cluster to a driver board. The cable assembly may or may not be IP 68 rated for outdoor use. A light guide assembly can include a visible element such as a bulb and may also include a neck and/or a collimating lens (not pictured). The parts in this assembly can be selected based on the LEDs being used. Light guides can be composed of optical grade PMMA/Acrylic and other material. A layer of light-scattering diffusion on the outside of the bulb which can be applied as a coating or as a surface treatment. This may also include a UV coating and an anti-reflective coating.

A control unit, such as a driver board, can send line voltages down the cable assembly to the LED cluster. Light from the LED cluster is channeled into the light guide assembly. If it is required by the type of LED used, the light guide will initially be used to mix the colors of the individual red, green and blue LEDs. The light will next pass into the visible part of the light guide, such as the bulb, where it is reflected until it strikes the outside of the bulb can be treated to allow the light in the guide to escape. This makes the light guide glow.

Any number of such pixel light tiles may be used in a system. To maximize light output and color mixing a tube could be used with LED clusters at both ends. The light guides can be irregular shapes and heights to create a video topography. Surface Mounted LEDs may require no mixing light guide and a significantly smaller bulb portion. A high intensity white (or other color) LED can shine down from the middle to light space below while the video pixel makes the light tile glow. This in essence becomes a pixel within a pixel.

A coating may be used to improve contrast. Alternate materials may be used for the light guide such as polycarbonate. Any number of LED's may be used as well as different combinations of colors. Applications for a bulb based pixel light tiles include a video ceiling, a video dividing wall, a video curtain for a performance in the round and a window decoration in an atrium. The screen can also be used in conjunction with a number of hard and soft translucent coverings.

One embodiment of the present invention uses a group of relatively large pixel light tiles. In one embodiment, at least some of the light tiles being greater than or equal to 20 mm in pixel size. At least one LED can be used to produce light of different colors. A control unit is adapted to set the color of the light tiles in accordance with a video signal.

The light tiles can be constructed using a light guide as described above. The light guide can spread the light over a wider area. Light from different colored LEDs is mixed in the light guide.

Alternately, an embodiment without a light guide can be used. Large-sized LEDs can be used. In one embodiment, groups of LEDs or clusters of LEDs driven with the same signal can be used. The LED(s), LED groups or LED clusters can be positioned on the outside of the light tile. In this way a pixel size of greater than 20 mm can be created.

Organic LEDS (OLEDs) and polymer LEDs (PLEDs) can be used. OLEDs and PLEDs are especially useful for the embodiment without a light guide.

In addition to retail environments, the embodiments of the present invention are useful for many other applications including concert touring, TV production, other architectural environments, clubs, theme parks, corporate events, etc. In one embodiment users can use the light tiles to form scenic elements.

There are many uses for the light tiles in furniture for use as table tops, Chinese/Japanese folding screens, counter tops, headboard for beds, and shelving. The light tiles can be a substitute for traditional ceramic/mosaic tiles for example in showers, etc.

The light tiles can be used as floor panels and ceiling tiles. The light tiles can cover the outside of a building or be used to produce doors. The light guide can be curved or an irregular shape (octagon, mosaic tile, etc). The light guide can be an entire object: such as a chair, table top.

The frames used can be constructed of a flexible material, such as rubber. This can allow the frames to be connected to a curved wall for example. The frames can be hinged.

The light tiles can be light from the edge to allow the light tiles to be placed with little or no gap between the tiles. The tiles can have beveled edges allowing the LEDs to shine in at an angle from behind. Mirrors, prisms, or other optical devices can be used to reflect the light. This may make the system slightly deeper, but it can eliminate/minimize the frame around each pixel.

In one embodiment, the light guide is mostly transparent when the LEDs are turned off and suitable for use as a window. When turned on, the light guide glows with color.

In one embodiment, a large diffuser which covers multiple light tiles is positioned in front of the light tiles to make a seamless image. The diffuser can be positioned some distance from the light tiles.

In one embodiment, the circuit board and a light guide are placed in a metal frame and no assembly holds the two together before placing them in the frame. The frame and the light guides can be a single piece of molded acrylic or polycarbonate. The circuit boards containing the LEDs can be slotted in place in this block.

In one embodiment, the light guide can include active and non-active areas. The non-active area will not glow as significantly as the active area. An active area of the light guide ca be a distance from the LED source in a larger sheet of acrylic instead of starting right by the LED sources.

A light guide can have variable density of reflecting material. One use of a variable density of reflecting material is to help maintain an even light output as light intensity falls off from the source. A gradient pattern can keep the apparent intensity constant.

In one embodiment, a wall can be made of vertical rods where the light guides radiate from the rods in a fixed or variable manner. The rods themselves can also move. In one embodiment, a light tile is a laminated piece of plastic/glass where the LEDs and the light guides are contained in a sandwich. All of the elements can be transparent.

Silk screening can be used to create different shapes and patterns on the light tiles. Reflective materials behind the light guide can be used to show different images when the light is off.

The light tiles can be a single or dual color version. A single color version can effectively produces a black-and-white display. Information for a single or dual color version can be derived from a video signal.

The light tiles can be wirelessly connected to control elements using a wireless connection such as WiFi, Bluetooth, etc.

The light tiles can be linked to a trigger, such as a doorbell. The light tiles can use music to set the light functionality. For example, an audio signal can be used to produce a video signal that drives the light tiles. The light tiles can be linked to a clock to shine different colors at different times in the day. The light tiles can have a touch sensitive surface that activates the lights. Interactive feedback can be used to trigger the lights from sensors to detect, weight, sound, heat/motion, and/or ambient light levels.

In one embodiment a video output on the last light tile in a sequence is used to help verify remotely that the system is working.

In one embodiment, a laminated panel is used where the LEDs and the light guides are contained within a sandwich of transparent panels. The transparent panels could be acrylic, polycarbonate of glass or any other optically appropriate material.

In one embodiment, dichromic or other red, green and blue filters are used with white LED light sources to create a source of illumination for the light guide.

The foregoing description of preferred embodiments of the present invention has been provided for the purposes of illustration and description, it is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A system comprising:
support wires; and
at least two light tiles separately attached to and supported by the support wires, the light tiles including a light source and a light guide, wherein the support wires extend in a direction parallel to a light-emitting surface of the light tiles.

2. The system of claim 1, wherein the light tiles further include a heat sink coupled to side edges of the light tiles that are perpendicular to the light-emitting surface.

3. The system of claim 1, wherein the light tiles include a translucent shell, within which the light source and light guide are encased.

4. The system of claim 1, wherein a first light tile comprises a first attachment unit for connecting to a first support wire,
a second light tile comprises a second attachment unit for connecting to the first support wire, and
a first length from a first end of the first support wire to the first attachment unit is different from a second length from the first end of the first support wire to the second attachment unit.

5. The system of claim 1, wherein the light tiles attach to two of the support wires, each of the support wires being directly connected to at least three tiles.

6. The system of claim 1, wherein the support wires are parallel.

7. The system of claim 1, wherein the light source comprises an LED.

8. The system of claim 1, wherein each light source is fully sealed within its light tile, thereby preventing any water from permeating to the light source.

9. The system of claim 1, wherein light tiles are connected to one another for power and data distribution.

10. The system of claim 1, wherein the light source for a light tile can provide at least two different colors of light.

11. A light tile comprising:
a light source;
a light guide operably connected to the light source and encased within the light tile; and
an attachment unit adapted for attaching the light tile to a support wire.

12. The light tile of claim 11, wherein the light tile has two attachment units, on opposite side edges of the light tile, for attaching to support wires.

13. The light tile of claim 11, wherein the light source comprises an LED.

14. The light tile of claim 11, wherein the light source is fully sealed within by the light tile, thereby preventing any water from permeating to the light source.

15. The light tile of claim 11, wherein the light source provides light of different colors, which can be altered based on a video signal from a computer.

16. The light tile of claim 15 wherein the video signal can be coupled to light tile via a wireless connection.

17. A system comprising:
    an elongated support member, extending from a first attachment point to a second attachment point, wherein the elongated support member is a support wire; and
    at least two light tiles separately attached to the elongated support member between the first and second attachment points and supported by the support member, the light tiles including a light source.

18. The system of claim 17, wherein the light source comprises an LED.

19. The light tile of claim 17 wherein the elongated support member comprises at least five light tiles independently attached directly to the support wire.

* * * * *